(12) United States Patent
MacCormack et al.

(10) Patent No.: US 11,104,062 B2
(45) Date of Patent: Aug. 31, 2021

(54) ADHESIVE DISPENSING DEVICE

(71) Applicant: Mcor Technologies Limited, Dunleer (IE)

(72) Inventors: Fintan MacCormack, Ardee (IE); Conor MacCormack, Ardee (IE)

(73) Assignee: Mcor Technologies Limited, Dunleer (IE)

( * ) Notice: Subject to any disclaimer, the term of this patent is extended or adjusted under 35 U.S.C. 154(b) by 264 days.

(21) Appl. No.: 16/065,709

(22) PCT Filed: Dec. 22, 2016

(86) PCT No.: PCT/EP2016/082508
§ 371 (c)(1),
(2) Date: Jun. 22, 2018

(87) PCT Pub. No.: WO2017/109150
PCT Pub. Date: Jun. 29, 2017

(65) Prior Publication Data
US 2019/0001555 A1   Jan. 3, 2019

(30) Foreign Application Priority Data
Dec. 23, 2015   (GB) ...................................... 1522745

(51) Int. Cl.
*B29C 64/147* (2017.01)
*B33Y 30/00* (2015.01)
(Continued)

(52) U.S. Cl.
CPC .......... *B29C 64/147* (2017.08); *B05C 1/0821* (2013.01); *B29C 64/205* (2017.08);
(Continued)

(58) Field of Classification Search
CPC ........................... B29C 64/241; B29C 64/218
See application file for complete search history.

(56) References Cited

U.S. PATENT DOCUMENTS

| 5,116,067 A | 5/1992 | Johnson |
| 5,443,683 A | 8/1995 | Garrett |
| 2015/0048553 A1* | 2/2015 | Dietrich ................. B33Y 30/00 264/401 |

FOREIGN PATENT DOCUMENTS

| CN | 204196264 U | 3/2015 |
| GB | 2455124 A | 6/2009 |

(Continued)

OTHER PUBLICATIONS

UK Combined Search and Examination Report; Application No. GB1522745.7; dated May 27, 2016; 8 pages.
(Continued)

*Primary Examiner* — Christopher T Schatz
(74) *Attorney, Agent, or Firm* — Conley Rose, P. C.; Brooks W Taylor (57) ABSTRACT

An adhesive dispensing device, for use in layered object manufacturing (LOM) systems for rapid prototyping of a 3 dimensional (3D) object, for the application of adhesive to a target substrate S defining a layer of a 3D object, the device comprising an adhesive applicator wheel having a plurality of circumferentially spaced apart recesses for receiving adhesive, the adhesive dispensing device being movable relative to the target substrate to deposit adhesive at selected locations thereon, wherein the adhesive dispensing device is mounted for translation relative to the target substrate via a pivot mount configured such that the wheel aligns with its direction of translation relative to the target substrate to deposit adhesive at the selected locations.

17 Claims, 7 Drawing Sheets

(51) Int. Cl.
*B29C 64/205* (2017.01)
*B33Y 40/00* (2020.01)
*B05C 1/08* (2006.01)
*B29C 64/218* (2017.01)
*B29C 64/241* (2017.01)

(52) U.S. Cl.
CPC .......... *B29C 64/218* (2017.08); *B29C 64/241* (2017.08); *B33Y 30/00* (2014.12); *B33Y 40/00* (2014.12)

(56) References Cited

FOREIGN PATENT DOCUMENTS

GB 2511316 A 9/2014
WO 2009068672 A1 6/2009

OTHER PUBLICATIONS

PCT International Search Report; Application No. PCT/EP2016/082508; dated Apr. 4, 2017; 6 pages.
PCT Written Opinion of the International Searching Authority; Application No. PCT/EP2016/082508; dated Apr. 4, 2017; 8 pages.

\* cited by examiner

Fig. 7A                Fig. 7B

ADHESIVE DISPENSING DEVICE

CROSS-REFERENCE TO RELATED APPLICATIONS

This application is a U.S. National Stage of International Patent Application No. PCT/EP2016/082508 filed on Dec. 22, 2016, by Fintan MacCormack, et al. entitled, "An Adhesive Dispensing Device", which claims priority to U.K. Patent Application No. 1522745.7 filed Dec. 23, 2015, by Fintan MacCormack, et al. entitled, "An Adhesive Dispensing Device", both of which are incorporated by reference herein as if reproduced in their entirety.

FIELD OF THE INVENTION

The present disclosure relates to layered object manufacture (LOM) systems providing rapid prototyping capacity. In a preferred embodiment the disclosure relates to an adhesive dispensing device and in particular an adhesive dispensing device for use in applying adhesive in a Layered Object Manufacture (LOM) system for rapid prototyping (RP).

BACKGROUND

Rapid prototyping is defined as computer-controlled additive fabrication, in that an object can be fabricated by the addition of material rather than conventional machining methods that rely on removal or the subtraction of material. The term "rapid" is, it will be appreciated, a relative term but one that has specific meaning within the art, in that construction of a finished three dimensional article can take from several hours to several days, depending on the method used and the size and complexity of the model. There are many known methodologies that are employed within the general field of rapid prototyping Layered Object Manufacture (LOM) is one form of Rapid prototyping (RP) which relates to the successive layering of adhesive-coated paper, plastic or metal laminates which are then successively glued together and cut to shape with a knife or laser cutter.

In existing LOM systems that employ paper based raw materials, the paper is provided in the form of a roll. The roll of paper may be provided with adhesive already present on the underside. In this case, the adhesive may be activated by heat and/or pressure to form a bond onto the previous layer. In an alternative approach, adhesive may be applied to the underside of the material as it is drawn from a roll. However, there are a number of disadvantages associated with the use of roll material. For example, a machine is often operable only with specifically manufactured rolls of material, which may be expensive to obtain and/or difficult to replace. There are also disadvantages associated with the day to day use of rolls of raw material. For example, the rolls may become stuck or jammed in the feeding mechanism due to the pre-applied adhesive thereon. With the above, removal of the waste material can be very difficult because it is adhered together with the same adhesive force as the part being made. This can lead to the part being damaged during waste removal "weeding", as chisels and other sharp implements are often needed to prise the object free.

There are further limitations in the types of paper that are suitable for use in conventional LOM systems. As paper is composed of a randomly felted layer of fibre, it follows that the structure may have varying degrees of porosity. Paper is a highly porous material and contains as much as 70% air. Porosity of a sheet or layer is an indication of the moisture absorption of the paper, or the ability of a particular sheet or layer of paper to accept ink, water or in this case adhesive. When selecting a particular type of paper for LOM, it is important to consider the porosity of the paper.

The properties of the paper are clearly closely related to, and place limits on the types of adhesive that may be used. There are further issues and concerns relating to the application of adhesive to paper. In known printer like dispensing systems which rely on computer controlled electro-mechanical devices such as piezoelectric dispensing heads, the heads are often of a delicate nature and over long periods of inactivity these devices can become clogged and may need to be serviced, maintained and replaced frequently. Thus, such arrangements may have high overheads for maintenance and repair.

Other methods of applying adhesive between paper layers include:
1. Coating the entire working area of the substrate or layer, which as noted above produces significant difficulties when removing waste material during post processing the finished part;
2. Using a substance which when placed in certain locations on the layer or sheet prevents adhesion at these locations. This technique has the disadvantage of effectively wasting adhesive by initially coating the entire layer or sheet and then rendering portions of the adhesive "non-sticky" with the use of an "anti-glue" substance; or,
3. Using an electrostatic system to xerographically deposit adhesive toner onto the sheet surface like a conventional printer prints ink.

This method can have the disadvantage of being technically complicated and requiring specially manufactured adhesive toner.

It is further noted that current LOM systems use adhesives that are solvent based and which are not water soluble and thus present environmental issues for example, for the purposes of disposal. However, such solvent based adhesives have to date been used in LOM as the use of water based adhesives having a high wet content presents further problems such as warping and distortion of the paper which has prejudiced their application in LOM systems.

Reference is made to applicant's earlier PCT application WO 2009/068672. The arrangement of that application provides an adhesive dispensing device which allows for controlled application of adhesive for building a 3-D object. The systems and methods therein support the use of water based adhesives as binding agent for the layering process. By controlling the volume and/or location of the dispensed adhesive such a LOM system allows for the use of water based adhesives while minimising the warping or distortion of the cellulose based paper material that is used in the layering. The wheel of the present disclosure may be used with the arrangements of the earlier PCT application WO 2009/068672 the contents of which are herein incorporated by reference. The wheel of the present disclosure may also be used with other suitable arrangements and Selective Deposition Lamination (SDL) or LOM systems.

As 3D printing systems and 3D printing develops, they systems are being used to make increasing complex objects and in increasing volumes. There is a need for an improved adhesive dispensing device taking account of the possible complexity of builds and the need to reduce durations of builds and the overall size and complexity of the systems.

BRIEF SUMMARY OF THE DISCLOSURE

According to a first aspect, there is provided an adhesive dispensing device, for use in layered object manufacturing (LOM) systems for rapid prototyping of a 3-dimensional (3D) object, for the application of adhesive to a target substrate S defining a layer of a 3D object, the device comprising an adhesive applicator wheel having a plurality of circumferentially spaced apart recesses for receiving adhesive, the adhesive dispensing device being movable relative to the target substrate to deposit adhesive at selected locations thereon, wherein the adhesive dispensing device is mounted for translation relative to the target substrate via a pivot mount configured such that the wheel aligns with its direction of translation relative to the target substrate to deposit adhesive at the selected locations.

In one embodiment, the adhesive dispensing device including the wheel is mounted such that the center of gravity thereof is directly in line with the pivot point. In one embodiment, the adhesive dispensing device is mounted to pivot about a pivot axis passing through the pivot point. In one embodiment, the adhesive dispensing device is mounted for pivoting through 360 degrees relative to the pivot point.

In one embodiment, the wheel is mounted at an offset relative to the pivot axis. In one embodiment, the wheel is mounted such that it aligns with the direction of translation of the wheel relative to the substrate. The wheel is mounted to pivot due to tangential forces when moved over the substrate to align with the direction of travel.

In one embodiment, the adhesive dispensing device is translated according to the form of the 3D object to deposit adhesive according to the form of the 3D object.

The arrangement of the adhesive dispensing device of the present disclosure advantageously provides a device and wheel which aligns with its direction of translation. This advantageously provides that the wheel is effectively translated in the forward direction continuously to deposit adhesive. The wheel has a leading edge and a trailing edge, and if effect as the wheel is arranged to align with the direction of travel, the adhesive device and wheel can be translated in a substantially continuous forward path for the adhesive deposition run for a particular layer. This is in contrast to prior art devices where it may have been necessary to lift the wheel and move the wheel to a start position for laying down each adhesive line.

In one embodiment, the wheel is configured to deposit adhesive in linear, circular or other irregular paths as it is translated relative to the substrate.

The self-aligning adhesive dispensing device allows for a variety of glue patterns. Embodiments of the disclosure advantageously provide for the adhesive dispensing device to be translated in a path following the form of the perimeter of the object layer and for the form to be filled, for example, in a meander pattern.

The wheel being rotatable to convey adhesive filled in one or more recesses to a target substrate and to deposit controlled amounts of adhesive at discrete points thereon, and in one embodiment the wheel is configured to be rotated by the friction between the wheel and the target substrate.

In one embodiment, the wheel further comprises a friction wheel or sprocket wheel to assist wheel rotation. The friction wheel may be coupled to the glue wheel.

In one embodiment there is provided an adhesive wipe which together with the wheel defines an adhesive filling chamber for filling adhesive into one or more recesses as the wheel rotates relative to the wipe. In one embodiment, the device further comprises a flow control means for control of adhesive flow to the adhesive filler and to the recesses of the wheel. In one embodiment, the device is configured to prevent leakage of adhesive by the arrangement of the adhesive filling chamber and the flow control. In one embodiment, the flow control means is arranged such that when the wheel stops rotating, the adhesive is switched off too. In one embodiment, the control means comprises a valve, for example a solenoid valve.

In one embodiment, the device further comprises a downward force control means for controlling and varying the downward force exerted by the wheel on the substrate S as it is translated relative to the substrate. The control means provides for variation of the force applied allows control of the amount of adhesive deposited per glue dot.

In one embodiment, the dispenser operably provides for the selective dispensing of adhesive of predetermined volumes at specific locations on the paper substrate.

In one embodiment, the down force control means comprises a solenoid or a voice coil.

According to another aspect there is provided a layered object manufacturing (LOM) or SDL system for rapid prototyping incorporating an adhesive dispensing device as claimed in any preceding claim.

According to another aspect there is provided a layered object manufacturing (LOM) system for rapid prototyping, the system providing for the application of adhesive onto multiple layers of a paper substrate to effect generation of a three dimensional object, the system comprising:
 a) a reservoir for the adhesive;
 b) an adhesive dispenser device in fluid communication with the reservoir for dispensing the adhesive from the reservoir onto the substrate;
 c) control means operable on the dispenser for directing the dispenser to specific locations of the substrate for subsequent dispensing of adhesive onto the paper substrate, and
 wherein the dispenser is mounted for translation relative to a target substrate and comprises a pivotably mounted self-aligning dispenser configured to dispense adhesive as it is translated relative to the layer of the 3D object.

In one embodiment, the dispenser comprises a force control means which operably provides for the selective dispensing of adhesive of predetermined volumes at specific locations on the paper substrate. In one embodiment, the device comprises control means operable on the dispenser for directing the dispenser to specific locations of the substrate for subsequent dispensing of adhesive onto the paper substrate. In one embodiment, the system comprising dispenser drive means and control means is operable to control the direction and velocity of translation of the adhesive dispensing device and wheel relative to the substrate. In one embodiment, the angular movement of the wheel relative to the wipe and substrate is controlled by the translation of the dispenser relative to the substrate, the wheel being configured to rotate due to friction between wheel and substrate.

In one embodiment, the adhesive comprises a water based adhesive, for example a Polyvinyl Acetate (PVA) adhesive. In one embodiment, the adhesive is operably deposited from a filled recess to the target substrate by means of capillary action.

In one embodiment, the adhesive dispenser device being configured for operable mounting to a head on a x-y frame of the system and configured for movement on the x-y frame relative to the target substrate. The head may be a multi-functional head configured to transport various components operable to form the object layer relative to the object layer.

According to a further aspect, there is provided a method of applying adhesive for the manufacture of a 3D object using embodiments of the disclosure, the method including:

applying adhesive to individual layers of multiple layers of a 3D object;

applying adhesive according to a glue pattern as defined by a digital print file for that layer;

wherein the glue pattern is firstly applied in a path according to the form of the periphery of the object at that layer and secondly applied to fill the form of the object at the layer.

In one embodiment, the path comprises a continuous path. In one embodiment, the adhesive is deposited in the form of a line of dots of adhesive. In one embodiment, the line is a continuous line. In one embodiment, the volume of individual dots may be varied by varying the downward force exerted by the wheel on the layer of the object at the point of contact.

These and other features will be better understood with reference to the drawings which follow.

BRIEF DESCRIPTION OF THE DRAWINGS

The present disclosure will now be described with reference to the accompanying drawings in which.

DETAILED DESCRIPTION OF THE DRAWINGS

Figure 6:
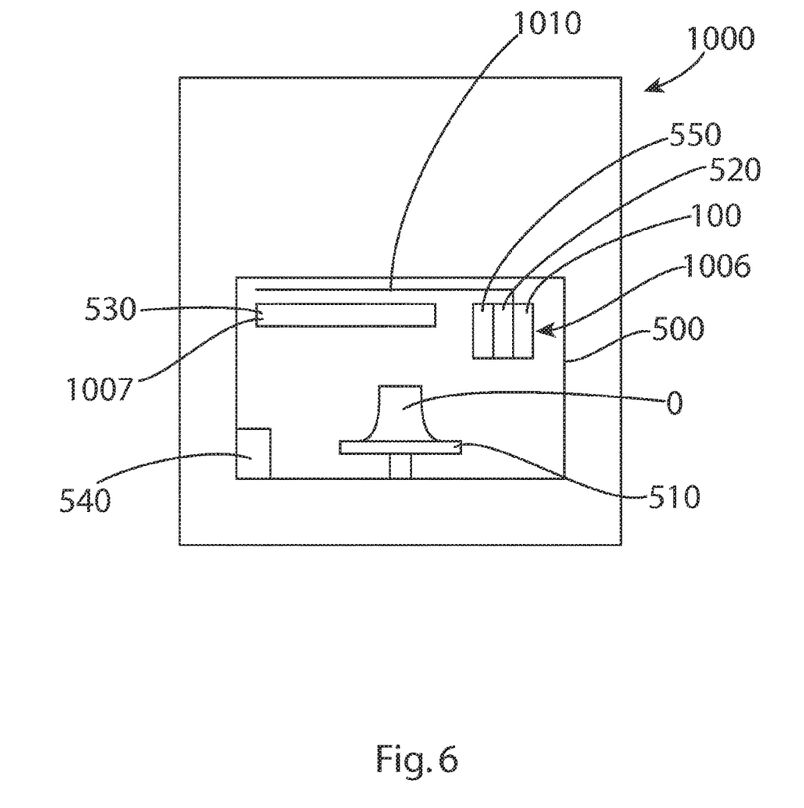
FIG. 6 is block diagram of an exemplary SDL or LOM system including an adhesive dispensing device according to the disclosure.

Referring to the drawings and initially in particular to FIG. 6 specific components of a layered object (LOM) manufacturing system or Selective Deposition Lamination (SDL) system 1000 for the manufacture of 3D objects are described. The system 1000 includes a build module 500. The build module 500 includes an adhesive dispensing device 100, a build plate 510, cutting means 520, bonding means 530, substrate or paper feed means 540. The disclosure in particular focuses on the adhesive dispensing device 100.

Referring to the drawings in particular, FIGS. 1-5, a component of the overall SDL (or LOM) system 1000 is the adhesive dispensing device 100. The adhesive dispensing device 100 comprises an adhesive applicator wheel 150 also referred to as glue wheel 150. The adhesive dispensing device 100 is configured for connection to an adhesive reservoir 110. The adhesive dispensing device 100 comprises an adhesive filler 120, which couples the adhesive reservoir 110 and which conveys the adhesive applicator wheel 150.

The adhesive applicator wheel 150 has a plurality of circumferentially spaced apart recesses for receiving adhesive, the adhesive dispensing device 100 and adhesive applicator wheel 150 is movable relative to the target substrate S to deposit adhesive at selected locations thereon. Adhesive is applied as recesses 152 of the wheel are moved as the wheel rotates into contact with the target substrate S. Adhesive is applied by capillary action.

In the specification, the terms glue wheel, adhesive dispensing wheel, applicator wheel have been used to describe the wheel arrangement reflecting the language of the field of technology.

The adhesive dispensing device 100 comprises a movable portion or movable body portion. The movable components include adhesive filler 120, support 125, wipe 130 and adhesive applicator wheel 150. The adhesive filler 120 is connected to an adhesive feed from an adhesive reservoir 110 at an inlet portion 122. The connection comprises a pivot connection 155. The adhesive filler 120 and wipe 130 convey adhesive A from the inlet portion 122 to an adhesive outlet portion 135 at the wheel 150. The adhesive filler 120 may convey the adhesive for example via one or more channels to an adhesive outlet portion 135 at wipe 130. The wipe 130 together with the adhesive applicator wheel 150 define an adhesive filling chamber 136 for filling adhesive to the recesses 152 of the wheel. The wipe 130 depends or extends downwardly from the adhesive filler 120 and has lateral side walls connected by front and back longitudinal side walls 142 and 143 defining an opening and configured to be coupled to and to contact the adhesive applicator wheel 150.

The adhesive dispensing device 100 may further comprise a controller 115 for controlling parameters of operation of the device including movement: location and translation, adhesive flow, and downward force exerted by the adhesive applicator wheel 150 on a substrate.

The adhesive dispensing device 100 is mounted for translation relative to the target substrate S. The adhesive dispensing device 100 comprises a pivot connection 155 and is configured such that the body portion (filler, support, wipe) and adhesive applicator wheel 150, which is the portion of the device which contacts the target substrate S, pivot as the device is translated relative to the substrate, such that the adhesive dispensing wheel operably aligns with its direction of translation relative to the target substrate S to deposit adhesive at the selected locations according to the form of the 3D object.

The pivot connection 155 provides that the adhesive dispensing device 100, comprising body portion and the adhesive applicator wheel 150 can pivot through 360 degrees.

In the exemplary embodiments shown in the drawings, the adhesive dispensing device 100 including filler 120, wipe 130, support 125, and adhesive applicator wheel 150 are arranged to pivot.

Figure 2:
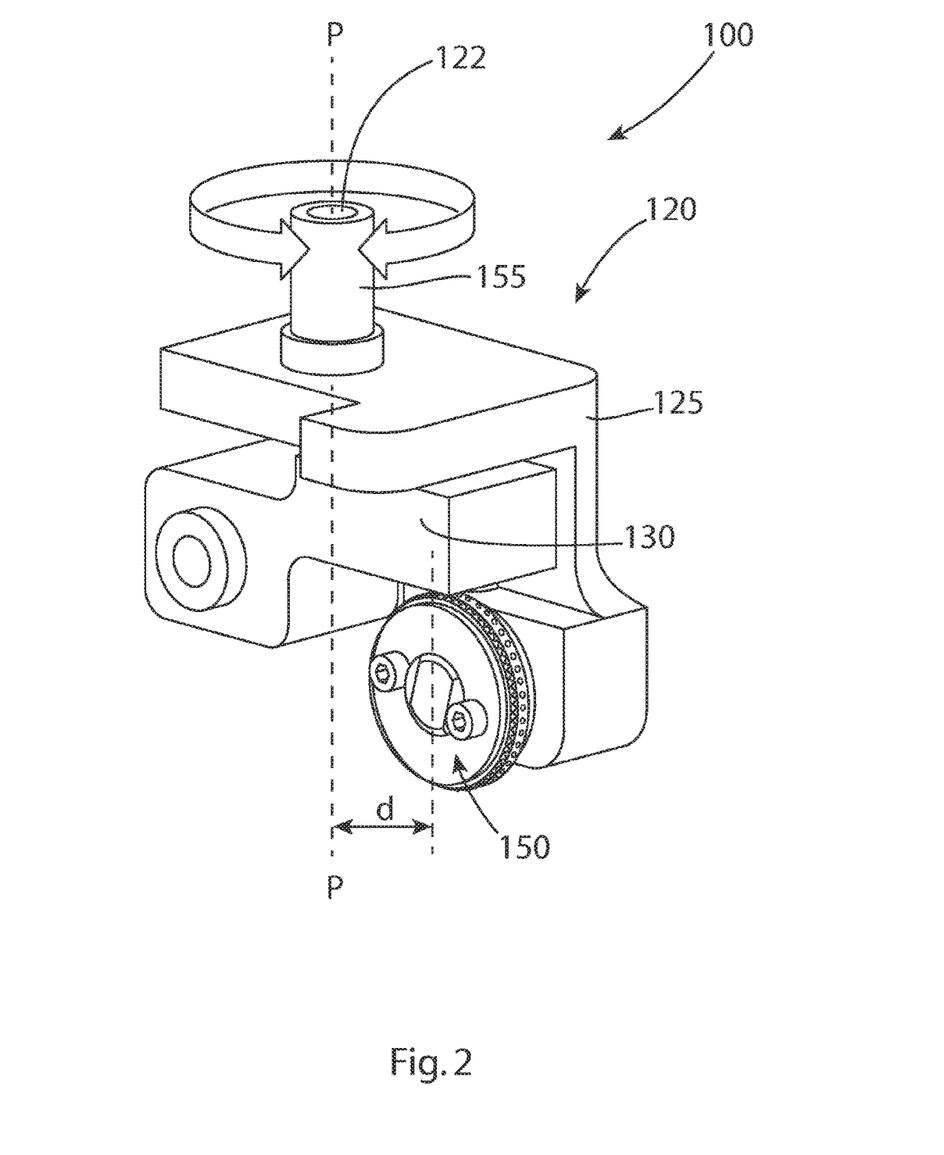
FIG. 2 is a perspective view of the device of FIG. 1 from the side showing the pivot axis.
Figure 3:
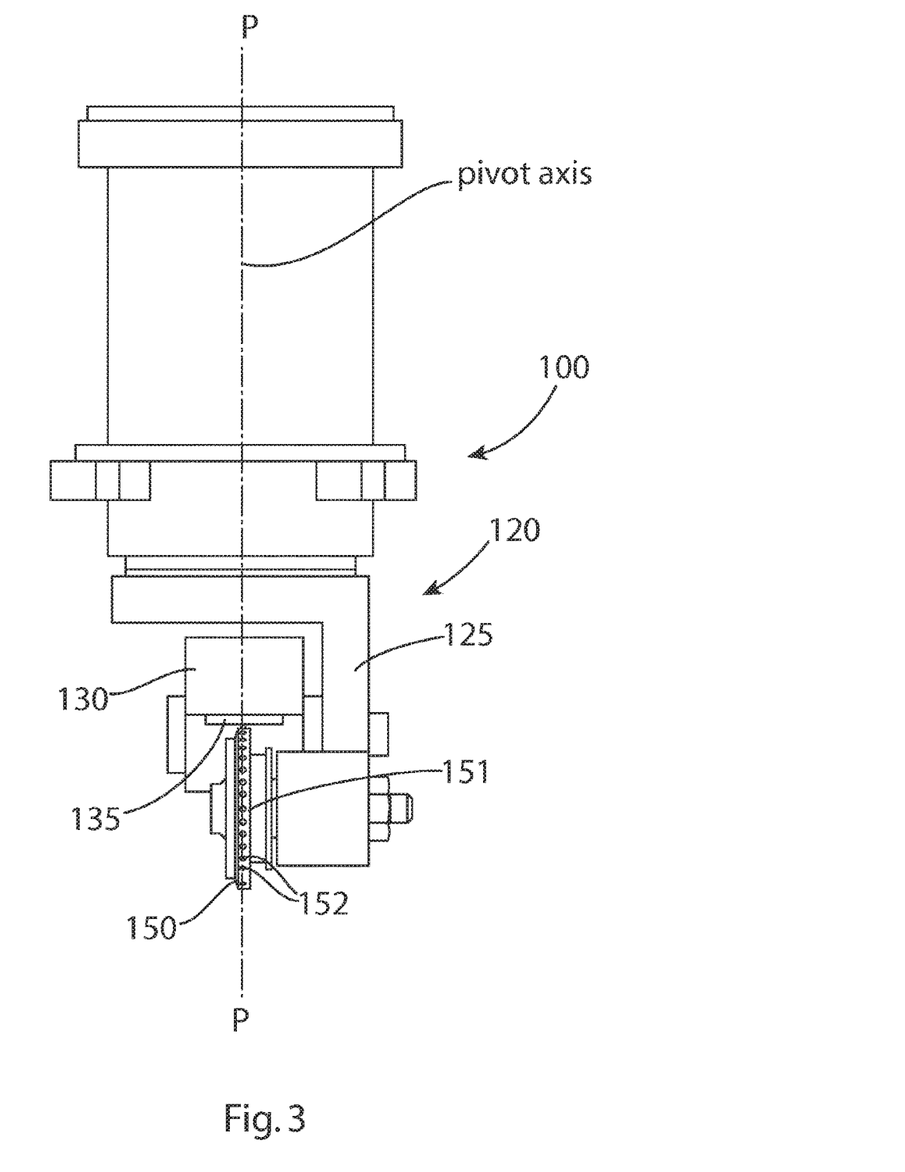
FIG. 3 is a front view of the device of FIGS. 1 and 2 showing a wipe and dimpled adhesive dispensing wheel.
Figure 4:
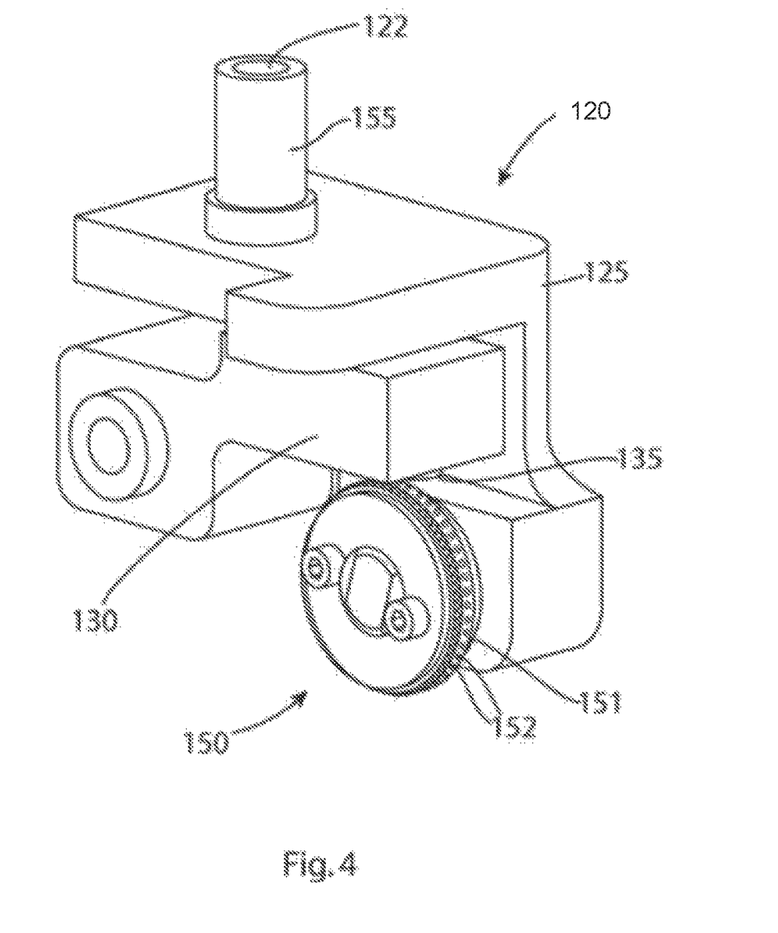
FIG. 4 is a perspective view from the side of the device of FIG. 4.

Referring to FIG. 2, an exemplary rotatable or pivotable mounting embodiment according to the disclosure is shown, where the axis of rotation is illustrated. Referring to FIG. 3 the axis of rotation of an exemplary embodiment of the disclosure is shown in a front side view.

The adhesive dispensing device 100 is configured to swivel or pivot as it is moved over the substrate S to align the adhesive applicator wheel 150 with the direction of travel. The swivel arrangement of the adhesive dispensing device 100 is provided by virtue of the pivot mounting. The adhesive dispensing device can swivel due to tangential forces when moved over the target substrate or layer to align with the direction of travel.

It is noted that movable body portion of the adhesive dispensing device 100 is mounted to pivot about the pivot axis P-P. Referring to FIG. 3 the adhesive dispensing device 100 is mounted such that the center of gravity of the rotating or pivoting mass thereof is directly in line with the pivot point. Referring to FIG. 2 the mass of the rotating components is arranged in line with the pivot axis P-P. The point of contact of the adhesive applicator wheel 150 with the substrate is offset (by an offset d—see FIG. 2) from the pivot axis P-P. In particular, the glue wheel is mounted to swivel or rotate relative to the pivot axis P-P by virtue of the mounting of the wheel at an offset relative to the mounting see—FIG. 2 illustrating axis and mounting.

The glue wheel 150 (similarly to the overall adhesive dispensing device 100) is mounted via a swivel or pivot mount 155 to rotate through 360 degrees. The components which are mounted to pivot include the support 125 and filler 120 and wipe 130 and adhesive applicator wheel 150.

The pivot mount 155 allows for the deposition of adhesive in a continuous adhesive dispensing run. The adhesive may be deposited in any direction, this is in contrast to prior art systems where the adhesive may be deposited in linear rows or columns by the linear line-wise translation of the adhesive dispenser relative to a surface. The adhesive applicator wheel 150 always aligns such that it is running forwardly in the direction of translation.

Figure 7A:
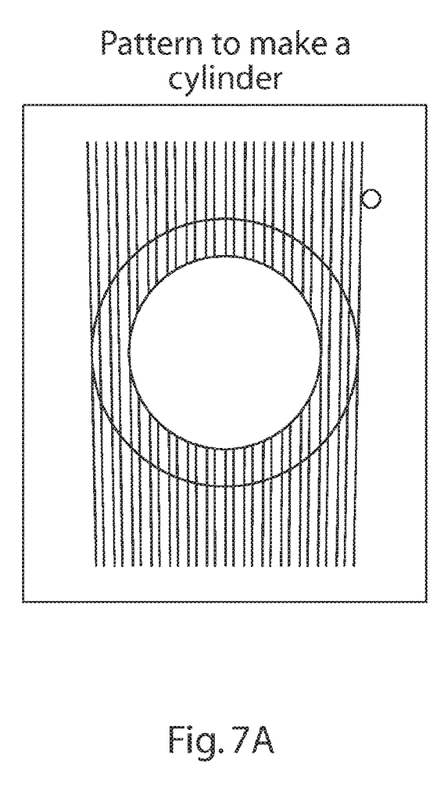
FIG. 7a shows a prior art glue pattern and FIG. 7B shows a glue pattern as provided by the systems and method according to the disclosure.

The embodiment of the adhesive dispensing device 100 provides for a new approach to laying down a glue pattern. Whereas in the prior art glue might often have been deposited in unidirectional lines or backward and forward lines, necessitating that the glue wheel be lifted and located in preparation for each line run. See FIG. 7A.

Figure 7B:
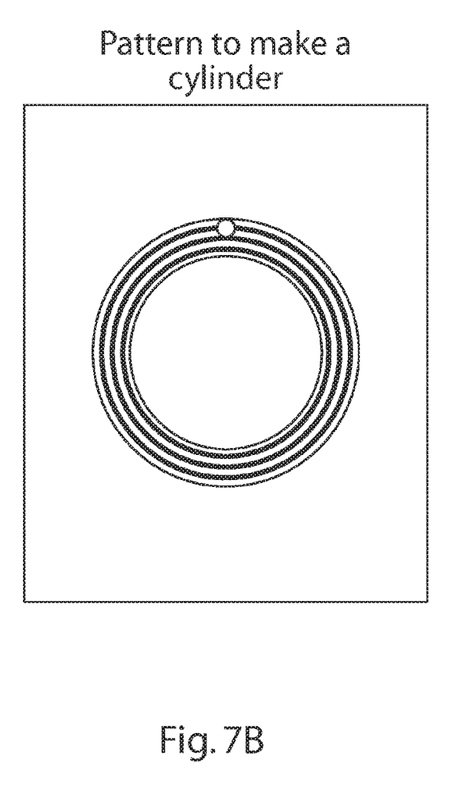

The system of the disclosure provides for deposition of glue to a substrate or layer in one or more continuous runs not limited to straight line runs. See FIG. 7B. For example, taking the case of a build object of cube form, adhesive may be deposited to a layer of the object of square form by translating the adhesive dispensing device around the perimeter of the square form of a layer, and then translating the adhesive dispensing device to deposit adhesive to fill the square form. The glue is deposited to the perimeter and then in a meander pattern to fill. The wheel of the adhesive dispensing device 100 aligns with the direction of translation and therefore the wheel pivots through each right angle corner of the square form to align for the application of adhesive to each of the side.

The new glue pattern achievable with the adhesive dispensing device 100 allows increased control and efficiency in depositing glue to a layer. In comparison with the prior art, a deposition run for application of glue to a layer may be a single continuous run. In comparison with the prior art the need to lift, locate, and prime the wheel is addressed.

Figure 1:
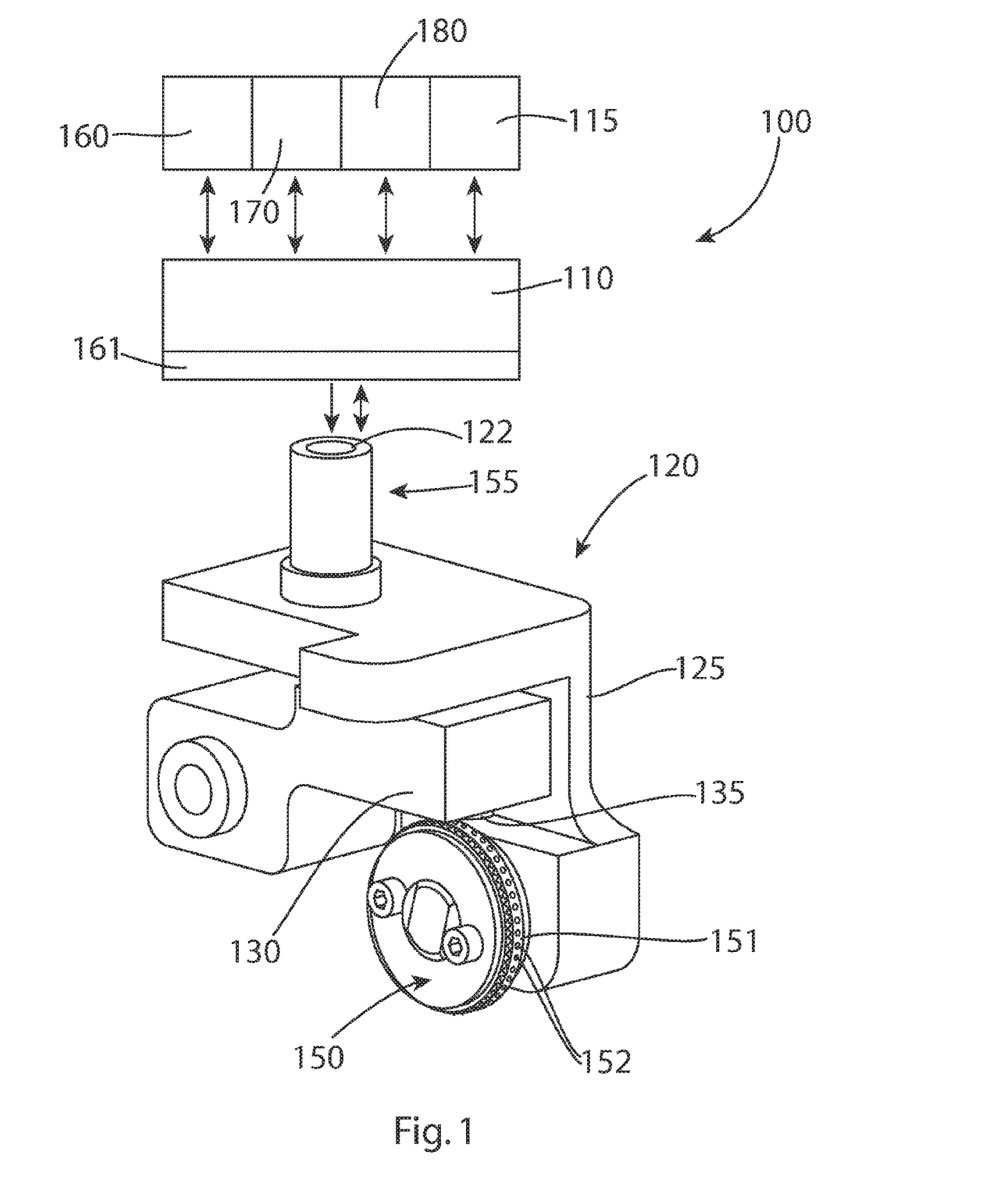
FIG. 1 is a perspective view of an adhesive dispensing device in accordance with the disclosure.

Referring to FIG. 1 and FIG. 6, control of various components and operations of the adhesive dispensing device 100 include controller 115 which is configured to receive the digital print file, transport means 180 for translating the adhesive dispensing device, force application means 170 for controlling the downward force exerted by the wheel on the substrate and flow control 160 for controlling the flow of adhesive as stopped.

The example above refers to an object of regular form. However, it will be appreciated that the adhesive dispensing device 100 and glue wheel 150 thereof may be used to deposit adhesive also to irregular form layers also in a series of one or more continuous runs, e.g. following the perimeter form and then filling in the meander.

As noted above the adhesive dispensing device 100 provides control of the amount of adhesive or glue deposited at a particular point by control of the downward force exerted at the contact point of the wheel on the substrate. The downward force exerted can be varied from point to point along the glue pattern.

The self-aligning pivot mount 155 of the adhesive dispensing device 100 of the disclosure allows for the dispensing of adhesive in a continuous path, including a path of irregular form on a target substrate defining a layer of the 3D object according to the form at that layer. For example the adhesive may be dispensed according to the form of an edge of the object, including in a substantially circular path or in a spiral path or in a series of concentric circles corresponding to a generally circular object. The path may also be irregular. See FIG. 7B.

The glue wheel 150 is rotated by the friction between the wheel and the layer or target substrate S.

Figure 5:
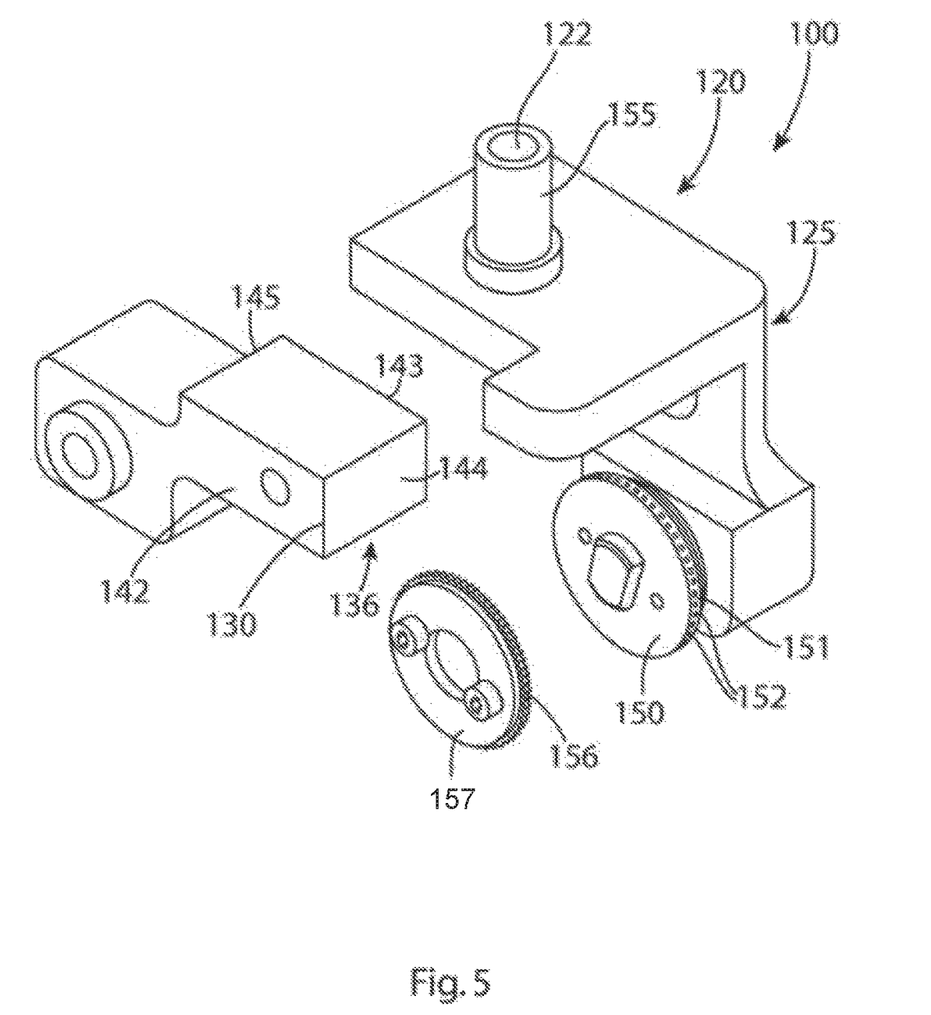
FIG. 5 is a drawing showing a perspective view of the components of FIG. 4.

In one embodiment, the glue wheel 150 may further comprise a friction wheel 155. The friction wheel 157 aids the glue wheel 150 in rotation as the glue wheel 150 is moved across a target substrate S. The friction wheel 157 is, in one embodiment according to FIG. 5, provided separate from the glue wheel 150 and arranged for coupling thereto. The friction wheel 157 may be integrated with the glue wheel 150. The friction wheel 157 may comprise sprockets 156, however, it will be appreciated that other suitable embodiments which aid rotation of the glue wheel 150 as it is moved across the target substrate S may also be provided. In particular, the friction wheel 157 assists with wheel rotation in use when there is glue between the wheel and the target substrate or layer S.

The embodiment of the wheel for swivelling and rotating through 360 degrees and for alignment relative to the direction of movement provides a wheel which allows the deposition of adhesive according to the form and shape required. For example, the wheel can be used to apply adhesive in a circular path, the wheel can be used to apply adhesive according to the edge form of each layer of an irregularly shaped 3D object.

Advantageously, embodiments of the disclosure is therefore not limited to straight lines any more. This enables the placement of adhesive in a more complex pattern and therefore more complex waste cuts which will enable the building of more complex objects from the 3D printer. For illustration comparison, reference is made FIG. 7A which shows the printing of a layer of circular form with a prior art system in which the adhesive is dispensed to the circular form in a series of parallel and/or unidirectional straight lines, and FIG. 7B which shows a glue pattern provided with the system of the present application. Clearly, the glue pattern of the new system requires less glue and less time is required to dispense adhesive to the form/object layer.

The adhesive applicator wheel 150 comprises a contact surface 151 having a plurality of recesses 152 for receiving adhesive A at the adhesive outlet portion 135. Adhesive is filled into the recesses 152 at the wipe 130 and is conveyed in the recesses 152 from the wipe 130 to a target substrate S as the adhesive applicator wheel 150 is rotated so that the recesses 152 contact the target substrate S.

The adhesive applicator wheel 150 and contact surface 151 is that portion of the adhesive applicator wheel 150 configured to contact both the wipe 130 of the filler 120 and a target substrate S, for example a sheet or layer of paper. The contact surface 151 and/or the recesses 152 may be comprised of or formed from a low friction material, for example Delrin and/or may comprise a low friction finish.

The adhesive dispensing device 100 comprises a flow control means 160 for control of adhesive flow to the adhesive filler 120 and to the recesses 152 of the adhesive applicator wheel 150. The control means is arranged such that when the adhesive applicator wheel 150 stops rotating, the adhesive is switched off too. In an exemplary embodiment of the disclosure, the control means comprises a valve, for example a solenoid valve 161. While in the exemplary embodiment the valve is a solenoid valve it will be appreciated that other suitable valves may be provided.

The adhesive dispensing device 100 further comprises force application means 170 for controlling and varying the downward force exerted by the adhesive applicator wheel 150 on the substrate S. The force control means by providing for variation of the force applied allows control of the amount of adhesive deposited per glue dot. This is advantageous and allows for application of different volumes of adhesive to different portions of the target substrate, for example lower volumes are areas to be weeded that at areas of the build, or for example higher volumes at a particular extremity of the build.

The adhesive is deposited to the substrate or layer or sheet S by capillary action. The capillary action due to the inherent porosity or water absorption of the substrate S. The substrate S may in particular be a paper substrate.

It will also be appreciated that the form of the recesses may be varied as required for the application needed for example to vary.

The system and glue wheel of the disclosure, by virtue of the combination of features therein, provide for control of the form and location of glue lines and also for control of the concentration of glue lines. The disclosed system further provides for the control of the glue weight per dot by varying the downward pressure.

The wipe 130 and adhesive applicator wheel 150 are designed to correspond and co-operate to define the adhesive filling chamber 136 having side walls defined by the wipe 130 and a base defined by the adhesive applicator wheel 150 thereof. The dimensions and form of the wipe 130 correspond to the adhesive applicator wheel 150 such that when the wipe 130 is coupled to the adhesive applicator wheel 150, the contact side or outlet portion 135 of the wipe 130 may comprise or be provided in an arc form corresponding substantially to the form of the adhesive applicator wheel 150. The adhesive filler 120 and wipe 130 comprises or may be in contact with a biasing means, for example, spring means to maintain the wipe 130 in contact with the adhesive applicator wheel 150.

The wipe 130 is configured to enable filling of the recesses 152 passing there through with adhesive A. In an exemplary embodiment, for the purposes of filling, the wipe 130 or sealed adhesive filling chamber 136 incorporates a vent means which facilitates replacement of air from recesses 152 with adhesive by allowing air to be displaced from the recesses 152 by the adhesive and providing means to remove or drive the air from the wipe 130 and sealed adhesive filing chamber 136. The vent means is provided by relative dimensions of the longitudinal side walls 142 and 143 of the wipe 130 and the recesses 152 and the manner of driven interaction of these components. Thus, the plurality of recesses 152 of the adhesive applicator wheel 150 are filled with adhesive A as they enter the wipe 130 as the adhesive applicator wheel 150 rotates. Filling is by gas or, in this case, air to adhesive exchange as the wheel moves relative to the wipe. Venting of a recess is by movement of the wheel which facilitates the air to adhesive exchange. Venting occurs at the point where a recess interacts with a leading or trailing edge 144 and 145 of the wipe 130.

The system 1000 provides for prevention of leak of adhesive. Firstly by the valve control, which stops the flow of adhesive when the rotation is stopped. Secondly by the form of the wipe 130, adhesive filling chamber 136 and adhesive applicator wheel 150.

If when the wheel stops rotating it happens that a single recess lies bridging an edge of the wipe, any leakage would be very limited due to the small size and volume of the recesses 152 and to the operation of the valve.

If, when the wheel stops rotating there is no recess bridging an edge of the wipe then the wipe and wheel form a substantially sealed adhesive filling chamber 136. Further, the valve will stop the filling of adhesive.

The spacing apart of the recesses 152 is selected taking account of the required concentration of glue dots to be laid down in a glue pattern. The spacing may be selected and varied as required.

Advantageously, in comparison with previous arrangements, the device and wheel of the disclosure do not require a motor, belt, pulleys, etc. because the glue wheel is rotated by the friction between the wheel and the layer or target substrate. In exemplary embodiments described, the adhesive dispensing device is mounted to a translatable head and the wheel is rotated by friction as the wheel contacts the substrate surface. The arrangement is therefore simplified in comparison with the prior art and is easier to install and maintain.

Advantageously in comparison with previous systems, the glue wheel can swivel due to tangential forces when moved over the layer or target substrate to align with the direction of travel—therefore not limited to straight lines any more. This enables placement adhesive in a more complex pattern and therefore more complex waste cuts which will enable the building of more complex objects from the 3D printer.

As noted above the adhesive dispensing device 100 and adhesive applicator wheel 150 may be mounted within an overall system 1000 to effect movement of the wheel relative to the surface via transport means 180. The transport means 180 provides for the movement of the adhesive dispensing device 100 and the adhesive applicator wheel 150 relative to the target substrate to particular locations and for the rotation of the wheel relative to the target substrate, the wheel is rotated by friction relative to the substrate.

In use, in an exemplary embodiment the adhesive dispensing device 100 may be mounted for translational movement relative to a substrate S, for example via an X-Y frame 1010 to enable movement of the head relative to the substrate.

The adhesive dispensing device 100 of the disclosure is suitable for use with a water based PVA adhesive.

Due to the nature of such adhesive the open time between laying down the adhesive and drying/setting of the adhesive is long, thereby enabling sufficient time to place subsequent substrate layers or sheets. The adhesive dispensing device provides for a very accurate control of the amounts of adhesive applied to a substrate. This is achieved in part by virtue of the form and dimensions of the recesses of the applicator wheel and by the spacing of the recesses on that wheel. In particular, the adhesive dispensing device 100 may be configured and used to dispense adhesive nanodots i.e. dots of adhesive having a volume of the order of 10-50 nanolitres, preferably in the order of 20-30 nanolitres. In this way the device may be used to deposit controlled amounts of a water based adhesive and such control reduces the problem of saturation of the substrate.

Referring to the drawings and in particular FIG. 6, a Layered Object Manufacturing (LOM) system 1000 for rapid prototyping incorporating an adhesive dispensing device 100 is shown.

The adhesive dispensing device 100 may in an exemplary embodiment be mounted directly to an adhesive dispensing device head or as part of a multifunctional head 1006 on an X-Y frame 1010, which enables the head 1006 to be positioned and moved as required over a substrate S on a build object O. Movement in the z direction is controlled by a solenoid or voice coil.

Paper is fed into the system. The LOM system 1000 further comprises bonding means 530, for example a roller, which is passed over the build object to ensure a positive bond of subsequent layers. The LOM system 1000 may further comprise a hot plate 1007 for applying pressure and curing the adhesive. The hot plate 1007 may be movable or fixedly mounted. Many of the features of the X-Y frame 1010 and the paper feed and placement are conventional and as such would be known to the skilled person in the field and are not described in detail here.

A method of use of the LOM system 1000 for rapid prototyping is also provided and may be considered as follows:

Using a three dimensional (3D) computer aided design (CAD) of an object/part to be manufactured; for example, a stereolithography (STL) file is generated within the CAD package and saved. This STL file is provided to a software package which controls operation of the LOM system 1000.

The software operates in accordance with the LOM system 1000 to generate a series of cross sections of the part and at any particular height each one a simple two dimensional (2D) profile.

A user operates the system/controller to output a control signal to the LOM system 1000 to commence building the build object O in 3D.

The LOM system 1000 then operates to lay down the layers of paper (substrate layers) of the build object and to cut each layer to the required profile. Individual layers are layered one upon the other to effect fabrication of a final structure.

The system provides for the variation of density and volume of adhesive dots applied to the substrate. This discriminatory application of the adhesive is facilitated through the use of a controller 115 that can accurately direct the adhesive dispensing system to specific target areas, and also by employing of an adhesive dispensing device 100 that does not effect a leaking or other inadvertent dispensing of the adhesive between desired dispensing positions.

The system may comprise a multifunctional head 1006 to which the adhesive dispensing device 100 and the cutting means 520 are mounted. The multifunctional head 1006 may further comprise a printhead 550. In an alternative embodiment, the adhesive dispensing device and/or cutter and/or printhead may be supported or mounted on different heads.

The X-Y frame 1010, as controlled by controller 115, translates and locates the active components (cutter, printer, adhesive dispensing device etc.) as required.

While in the description above, the method is focussed on the arrangement and operation of the adhesive dispensing device 100, it is noted as background that the overall method includes the following: feeding the substrate to the build plate 510 or build object O, bonding the layer to the build object O, cutting the profile of the layer, applying adhesive to the layer. The method may further include printing the layer before the application of adhesive.

This method continues until the entire 3D model has been built up layer by layer.

It will be understood therefore, that the LOM system 1000 incorporating the adhesive dispensing device 100 of the disclosure is thus suitable for use in the application of nanodots of adhesive for example in an LOM system for rapid prototyping.

The recesses 152, of the exemplary embodiment described have a substantially hemispherical form which has the advantage of providing substantially the greatest volume for any given surface area. This form has the further advantage of facilitating the easy interchange of air and adhesive as the recesses pass under the wipe 130.

In an exemplary embodiment, adhesive applicator wheel 150 having a diameter of 15 mm (millimeters) is used. It will be appreciated that the diameter of the wheel may be varied as required. However, the wheel is preferably less that 20 mm in diameter, and most preferably in the range of 15-20 mm in diameter.

While in the embodiment described the adhesive applicator wheel 150 of the adhesive dispenser device 100 has a single row of recesses on the wheel, it will be appreciated that a wheel may comprise more than one row of recesses. Similarly, while in the embodiment described, the adhesive dispenser includes one wheel, in an alternative embodiment a plurality of wheels could be provided, one or more of which may be independently moveable relative to others. Such arrangement would be aimed at increasing the speed of the adhesive application process. Also, it will be understood that while in the embodiment described, the recesses are equally spaced apart, in an alternative embodiment, the recesses spacing could be varied and substantially unequal. Such an arrangement would enable the deposition of different dot patterns depending on which part of the wheel was in contact.

It will be appreciated and understood that what has been described herein are exemplary embodiments of a layered object manufacturing system according to the disclosure. Use of such a system provides for the use of water based adhesives to bind successive layers of paper in generation of a three dimensional model.

Embodiments of the disclosure provide a system and method of applying adhesive to paper which ensures that the paper does not become saturated with adhesive thus minimising warping of the layer or sheet. The warping of the page is minimised by the fact that the quantity of adhesive deposited onto the substrate may be controlled as required. By providing precise control of the amounts of adhesive deposited on a substrate, it is possible to use water based adhesives for example, Polyvinyl Acetate (PVA). The system similarly facilitates the use of different and standard types of paper. The system thus uses conventional and readily available raw materials for example standard office paper and has the advantages of being user-friendly and easy to operate and supply. It will be understood that by providing a LOM process that uses water based adhesives and can be used with conventional paper supplies that recycling and waste issues are less problematic than with existing RP solutions. The paper supply that is used in the LOM process can be waste or discarded paper, and the waste paper from the LOM process can be easily recycled in the same manner as conventional recycling. The discard of water based adhesives is easier than discarding solvents or plastics such as are used in existing RP processes.

The system of the disclosure further provides excellent control on the positioning of the adhesive on a substrate. The density of adhesive laid down may also be controlled as can the size or volume of the dots. These features help to eliminate waste of adhesive.

While preferred embodiments have been described with reference to the figures, modifications can be made without departing from the scope of the invention which is to be limited solely by the claims. Where integers or components are described with reference to one figure it will be understood that they can be interchanged with those of another Figure without departing from the context of the invention.

The words comprises/comprising when used in this specification are to specify the presence of stated features, integers, steps or components but does not preclude the presence or addition of one or more other features, integers, steps, components or groups thereof.

The invention claimed is:

1. A layered object manufacturing system for rapid prototyping of a 3-dimensional (3D) object, the system comprising:
an adhesive dispensing device configured to apply adhesive to a target substrate defining a layer of a 3D object, the adhesive dispensing device comprising an adhesive applicator wheel having a plurality of circumferentially spaced apart recesses configured to receive the adhesive, the adhesive dispensing device being movable relative to the target substrate to deposit the adhesive at selected locations thereon, the adhesive dispensing device is configured to translate relative to the target substrate via a pivot mount configured to align the adhesive applicator wheel with a direction of translation relative to the target substrate to deposit the adhesive at the selected locations, wherein
the adhesive dispensing device is mounted such that a center of gravity of the adhesive dispensing device is directly in line with a pivot axis of the pivot mount; and
the adhesive dispensing device is configured to align with the direction of translation as it is translated relative to the substrate, wherein the adhesive applicator wheel is mounted at an offset relative to the pivot axis and is configured to pivot about the pivot axis to align with the direction of translation in response to tangential forces when moved over the target substrate.

2. The system as claimed in claim 1, wherein the adhesive dispensing device is configured to pivot through 360 degrees relative to the pivot axis.

3. The system as claimed in claim 1, wherein the adhesive device is configured to translate relative to the target substrate according to a form of the 3D object.

4. The system as claimed in claim 1, wherein the adhesive applicator wheel is configured to deposit adhesive in a selected one of a linear, circular, or irregular path as the adhesive applicator wheel is translated relative to the target substrate.

5. The system as claimed in claim 1, wherein the adhesive applicator wheel is configured to rotate to convey the adhesive filled in the plurality of recesses to the target substrate and to deposit controlled amounts of the adhesive at the selected locations on the target substrate, wherein the adhesive applicator wheel is configured to be rotated by a friction between the adhesive applicator wheel and the target substrate.

6. The system as claimed in claim 5, wherein the adhesive dispensing device further comprises one of a friction wheel or sprocket wheel mechanically coupled to the adhesive applicator wheel and configured to rotate the adhesive applicator wheel.

7. The system as claimed in claim 1, wherein the adhesive dispensing device further comprises an adhesive filling chamber, the adhesive filling chamber comprising an adhesive wipe and the adhesive applicator wheel, the adhesive wipe configured to fill adhesive into one or more of the plurality of recesses of the adhesive applicator wheel.

8. The system as claimed in claim 7, further comprising a flow control means for controlling adhesive flow to the adhesive filler and to the recesses of the adhesive applicator wheel.

9. The system as claimed in claim 8, wherein the system is configured to prevent leakage of adhesive by an arrangement of the adhesive filling chamber and the flow control means.

10. The system as claimed in claim 8, wherein the flow control means is configured to stop the adhesive flow when the adhesive applicator wheel stops rotating.

11. The system as claimed in claim 8, wherein the flow control means comprises a valve configured to control the adhesive flow.

12. The system as claimed in claim 1, further comprising a downward force control means for controlling and varying a downward force exerted by the adhesive applicator wheel on the target substrate as the adhesive applicator wheel is translated relative to the target substrate.

13. The system as claimed in claim 12, wherein the downward force control means is configured to control the amount of adhesive deposited from each recess of the plurality of circumferentially spaced apart recesses by varying the downward force exerted by the adhesive applicator wheel on the target substrate.

14. The system as claimed in claim 12, wherein a dispenser is configured to selectively dispense predetermined volumes of the adhesive at specific locations on the target substrate.

15. The system as claimed in claim 12, wherein the downward force control means comprises one of a solenoid or a voice coil.

16. The system as claimed in claim 1, wherein the adhesive comprises a water based adhesive and the target substrate comprises paper.

17. The system as claimed in claim 1, wherein the adhesive dispensing device is configured to mount to a multifunctional head on an x-y frame and to move on the x-y frame relative to the target substrate.

* * * * *